Nov. 10, 1931.  S. J. MURPHY  1,830,851

WELL CEMENTING APPARATUS

Filed Sept. 10, 1929

Inventor

S. J. Murphy

By Clarence A. O'Brien

Attorney

Patented Nov. 10, 1931

1,830,851

UNITED STATES PATENT OFFICE

SAMUEL J. MURPHY, OF WINK, TEXAS

WELL CEMENTING APPARATUS

Application filed September 10, 1929. Serial No. 391,664.

This invention appertains to new and useful improvements in well cementing means and more particularly to an apparatus for cementing wells in a quick and efficient manner.

The principal object of the invention is to provide a well cementing apparatus which can be easily installed and removed by reason of its sectional construction.

During the course of the following specification and claim numerous other important objects and advantages of the invention will readily become apparent to the reader.

Figure 1:
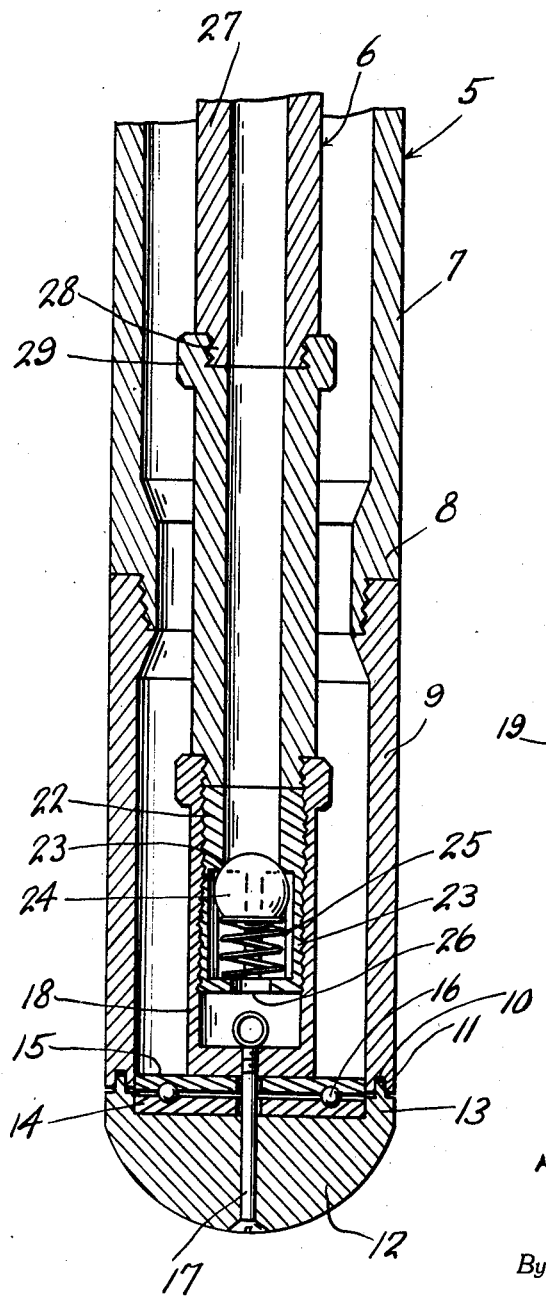
Figure 1 represents a fragmentary vertical sectional view through the assembled apparatus.
Figure 2:
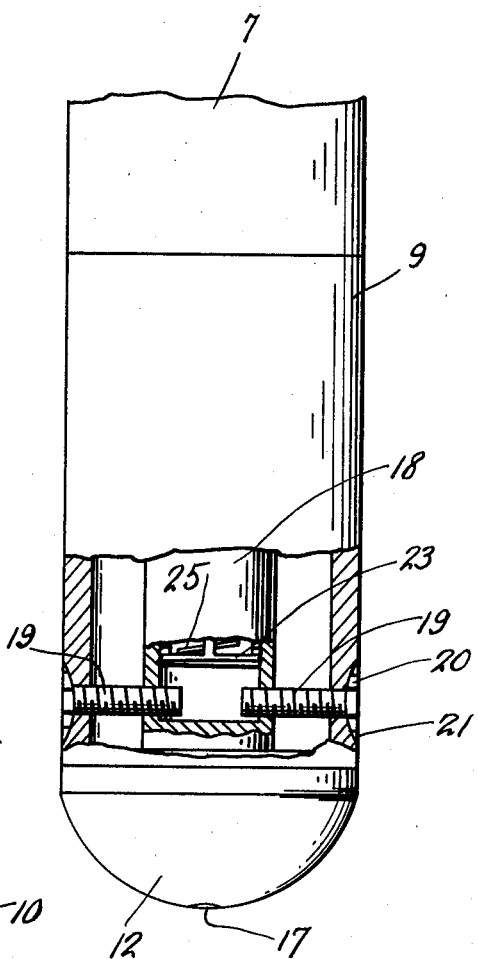
Figure 2 represents a fragmentary elevational and partial sectional view of the valved end of the apparatus.

Referring to the drawings wherein like numerals designate like parts, it will be seen that the apparatus includes the smoothing tube or casing generally referred to by numeral 5 and the cement delivering pipe generally referred to by numeral 6. The tube 5 is constructed in a multiplicity of sections 7, each having its ends enlarged as at 8 and either being internally threaded or externally threaded so that the sections may be connected and alined.

The lowermost section 9 has its lower end provided with a circumferentially extending groove 10 within which the annular tongue 11 of the bearing head 12 rides. The tongue 11 is on a shoulder 13 of the head and within the confines of the shoulder 13 is a plate 14 which has an annular ball bearing groove therein complementary to the groove in the top plate 15 so that balls 16 may be interposed between the plates 14 and 15 without likelihood of the same becoming displaced and at the same time being a raceway for the ball.

The plate 15 is fixed within the lower end of the section 9 and a bolt 17, extending through the head 12 swivelly connects the valve shell 18 and head 12 together. The valve shell 18 is internally threaded and has threaded pipes 19 extending from diametrically opposite sides thereof through openings in the section 9. These pipes 19 are threadedly engaged through openings in the said shell as well as through openings in the section 9 and nuts 20 engaging in pockets 21 on the outside of the section 9 serve to prevent displacement of the said pipes 19.

Threadedly engaged within the shell 18 is a tubular plug 22 from which depends a cage structure 23. The plug 22 is provided with a seat as at 23 against which the ball valve 24 is tensionally engaged through the action of the spring 25. The lower end of the cage is provided with an opening as at 26 through which cement may pass.

The cement delivery pipe 6 is composed of a plurality of sections 27, each of which has a reduced threaded end 28 and an internally threaded end which is also provided with a shoulder 29 engageable by a suitable tool to facilitate the removal of the section from association with the balance of the apparatus. Cement connection 30 is made with the pipe 6 through which cement is delivered to the pipe 6 in any suitable manner.

The pressure of the cement against the ball valve 24 will cause the unseating thereof and the resultant admission of the cement through the pipes 19 to the space between the tube 5 and the wall of the well bore.

While the foregoing description has been in detail, it is to be understood that numerous changes in the specific shape, size and materials may be resorted to without departing from the spirit of scope of the invention as claimed hereinafter.

Having thus described the invention, what is claimed is:

In a well cementing apparatus comprising, a casing, a delivery tube extending within the casing, a cone head rotatably connected with the lower end of the casing, said delivery tube being rotatably mounted on said cone head, said delivery tube provided with self adjusting material control means, material outlets extending through the opposite side of said delivery tube and said well casing for the purposes specified.

In testimony whereof I affix my signature.

SAMUEL J. MURPHY.